United States Patent [19]

Drew et al.

[11] 4,386,355

[45] May 31, 1983

[54] SYSTEM FOR DETERMINING THE LOCATION OF AN AIRBORNE VEHICLE TO THE EARTH USING A SATELLITE-BASE SIGNAL SOURCE

[75] Inventors: Prentis B. Drew, Kirkland; Ervin J. Nalos, Bellevue, both of Wash.

[73] Assignee: The Boeing Company, Seattle, Wash.

[21] Appl. No.: 135,440

[22] Filed: Mar. 31, 1980

[51] Int. Cl.³ .............................................. G01S 5/10
[52] U.S. Cl. ............................ 343/112 D; 343/5 MM; 343/100 ST
[58] Field of Search .......... 343/112 R, 112 D, 5 MM, 343/100 ST

[56] References Cited

U.S. PATENT DOCUMENTS

| | | | |
|---|---|---|---|
| 2,837,738 | 6/1958 | Van Valkenburgh | 343/112 R |
| 3,171,126 | 2/1965 | Wiley | 343/112 D X |
| 3,242,490 | 3/1966 | Wentworth et al. | 343/112 D X |
| 3,721,986 | 3/1973 | Kramer | 343/112 D X |
| 3,856,237 | 12/1974 | Torian et al. | 343/5 MM X |
| 3,863,257 | 1/1975 | Kang et al. | 343/112 D |
| 3,939,476 | 2/1976 | Leopard et al. | 343/112 D X |

Primary Examiner—T. H. Tubbesing
Attorney, Agent, or Firm—Cole, Jensen & Puntigam

[57] ABSTRACT

A satellite in geosynchronous orbit includes a source of signal illumination which is directed toward the earth, covering a given area thereof. An airborne vehicle, such as a missile, traveling over the area covered by the signal illumination from the satellite, includes a first antenna for receiving an incident set of signals from the satellite directly, and a second antenna for receiving the same signals from the satellite after they have been reflected from the earth's surface, referred to as a reflected set of signals. The altitude of the airborne vehicle may be ascertained by comparing the relative times at which the two sets of signals are received at the airborne vehicle, while the remaining location information, referred to as ground map information, may be ascertained by first determining range and angle data from the reflected signals and then comparing that data with ground map data stored aboard the airborne vehicle.

7 Claims, 6 Drawing Figures

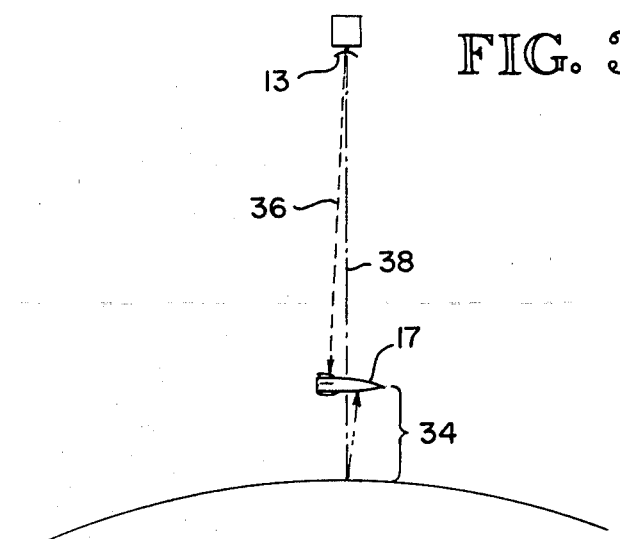
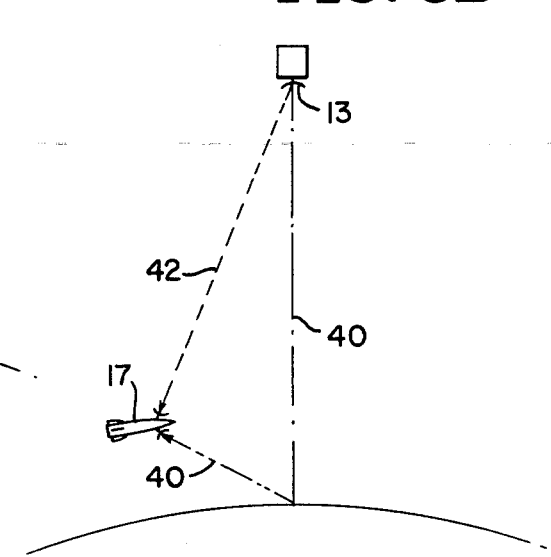
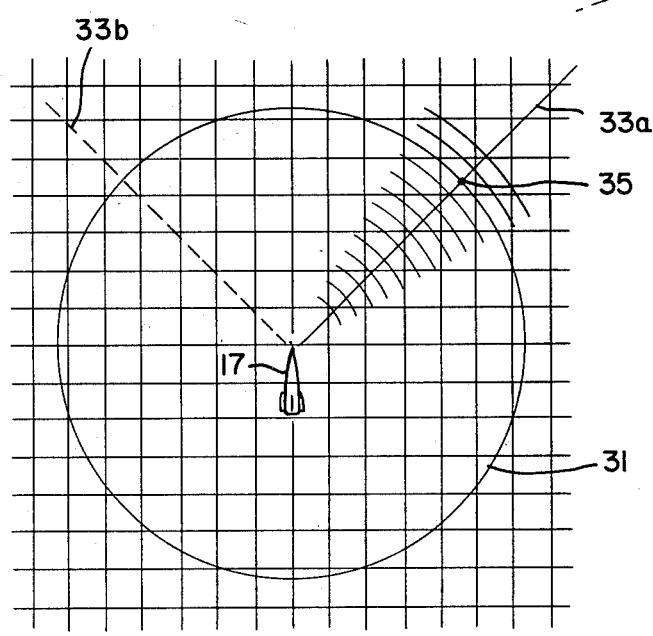

SYSTEM FOR DETERMINING THE LOCATION OF AN AIRBORNE VEHICLE TO THE EARTH USING A SATELLITE-BASE SIGNAL SOURCE

BACKGROUND OF THE INVENTION

This invention relates generally to the art of guidance systems for airborne vehicles, and more specifically concerns a guidance system in which the source of signal illumination is separate from the receiver, such as on a satellite.

In certain circumstances, it is important that opportunities for the discovery of an airborne vehicle, such as a missile, be minimized. Unfortunately, conventional missiles do provide many such opportunities for detection. For example, the guidance systems of most aircraft, including missiles, utilize radar emissions. Such guidance systems usually have both an altitude determining capability and a ground map capability. Ground mapping generally refers to a system of terrain correlation, in which the information produced by the on board guidance system concerning the terrain configuration beneath the airborne vehicle is compared with an actual map of the terrain, which has been previously stored in memory. The emissions of such a guidance system, however, identify the presence of the missile; they in effect act as a beacon, leading to the possible detection of the airborne vehicle and the opportunity for counter measures against the vehicle.

There have been several attempts to minimize the possibility of detection. In one approach, the emissions of the guidance system of a conventional missile are disguised to appear to be random noise. One example of this approach is commonly known in the art as a low probability of intercept radar (LPIR). The emissions of an LPIR system are still detectable, however, and if correctly interpreted, also present a possibility of detection. In another approach, the guidance system is emissionless, i.e. it is a passive guidance system. An example is a radiometric frequency guidance system which uses radiometric frequency energy generated by objects on the ground to provide the required information from which the location of the aircraft may be determined. The radiometric frequency range used is typically from 30 gigahertz to 300 gigahertz. Radiometric systems, however, are not completely satisfactory, since radiometric signals are attenuated by weather, and their image accuracy is relatively poor. Furthermore, the information from a radiometric guidance system is two-dimensional, since range data is not obtainable with passive radiometric systems. Finally, since point sources of radiometric energy become elongated as the range increases in the forward direction, the resolution of radiometric systems, aside from the area directly beneath the aircraft, is relatively poor.

Thus, there is currently a significant need for guidance systems for airborne vehicles such as missiles, which are essentially passive in operation in that they produce virtually no detectable emissions.

Accordingly, one object of the present invention is to provide a guidance system for aircraft and the like which does not utilize emissions from the aircraft.

Another object of the present invention is to provide such a system in which the source of emissions is based on a satellite.

It is a further object of the present invention to provide such a system in which the emissions are disguised so that they do not look like radar emissions.

It is a further object of the present invention to provide such a system which is capable of producing both ground map and altitude information in all weather conditions.

SUMMARY OF THE INVENTION

Accordingly, the present invention is a passive system which produces information about the position of an airborne vehicle relative to the ground, such as altitude and ground map information. The system includes a signal source which is located on a satellite or another similar base which is remote from the airborne vehicle. Antenna means is also provided, located on the airborne vehicle, for receiving a set of incident signals, said incident set comprising signals generated by said signal source and transmitted directly to said antenna means from said signal source, and for receiving a set of reflected signals, said reflected signals comprising the same signals generated by said signal source but which have been reflected from the earth prior to reaching the antenna means. The system further includes means which processes the differences between said incident and reflected sets of signals received by the antenna means to produce signal information which is indicative of the position of the airborne vehicle relative to the earth.

BRIEF DESCRIPTION OF THE DRAWINGS

A more thorough understanding of the invention may be obtained by a study of the following detailed description taken in conjunction with the accompanying drawings in which:

FIGS. 3a and 3b are pictorial diagrams showing two positions for an airborne vehicle with the system of FIG. 1.

FIG. 4 is a diagram showing the location of a single cell in a ground map relative to the airborne vehicle.

DESCRIPTION OF THE PREFERRED EMBODIMENT

Figure 1:
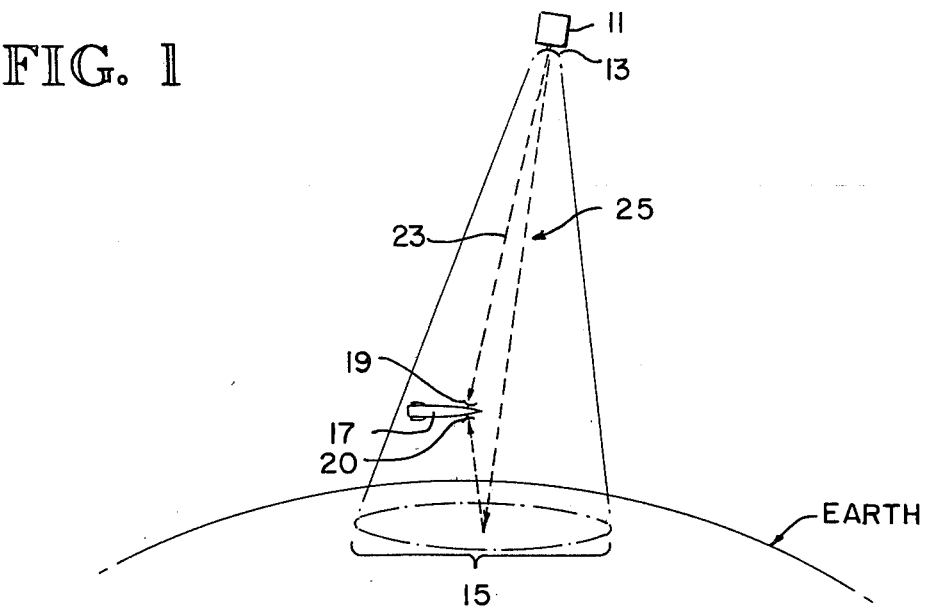
FIG. 1 is a pictorial diagram showing the system of the present invention.

Referring to FIG. 1, the system includes a satellite shown generally at 11, which is preferably positioned in a non-inclined, geosynchronous orbit, so that it is essentially moving in a stationary relationship with the earth at the equator. In such an orbit, the frequency of the signals produced by a signal source 13 and accompanying transmitting antenna on board the satellite 11 are the same over the entire area on the earth which is illuminated by the signals. Although it is not necessary to the operation of the present invention that the satellite be in such a non-inclined geosynchronous orbit, such an arrangement makes the calculation of the desired guidance information from the signals received at an aircraft 17 flying over the illuminated area less complicated.

The signal source 13 on satellite 11 is similar to that in a conventional radar system. The signals from signal source 13 illuminate a defined area 15 on the earth, the boundaries of which depend upon the spread of the signals, which in turn is dependent on the relationship of the satellite and the satellite's orbit to the earth at any given point in time. The signals produced by signal source 13 are the emissions which are detected and used by the guidance system on board aircraft 17. In the embodiment shown, these are coded pulses in the microwave frequency band, typically in the range of 1–18 ghz. In operation, the processing of the detection emissions occurs continuously on board the aircraft 17 during the time it is traveling over the area on the earth illuminated by signal source 13. The result of the processing is accurate altitude and ground map (position) information, which may then be used to correct the flight of the aircraft to a prescribed flight path, if necessary.

Figure 5:
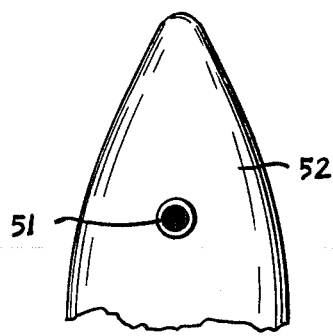
FIG. 5 is a top plan view of a portion of an airborne vehicle having a single omni-directional antenna, for use in the system of FIG. 2.

Located on aircraft 17, and a part of the system of the present invention in the embodiment shown, are two antennas 19 and 20. The first antenna 19 is up-looking, i.e. it is positioned on the aircraft so as to receive signals from signal source 13 directly, such as over the illustrated signal path 23. Antenna 20, on the other hand, is a down-looking antenna, located on the lower surface of the aircraft 17, to receive signals from source 13 which have been reflected from the earth following their generation, such as over signal path 25. The down-looking antenna 20 is a compliment to the up-looking antenna 19, although it is spread in time and frequency. Two antennas are not essential, however, as a single antenna, properly designed, would be adequate. FIG. 5, for instance, shows a single omni-directional antenna 51 on the fuselage of an airborne vehicle 52.

Figure 2:
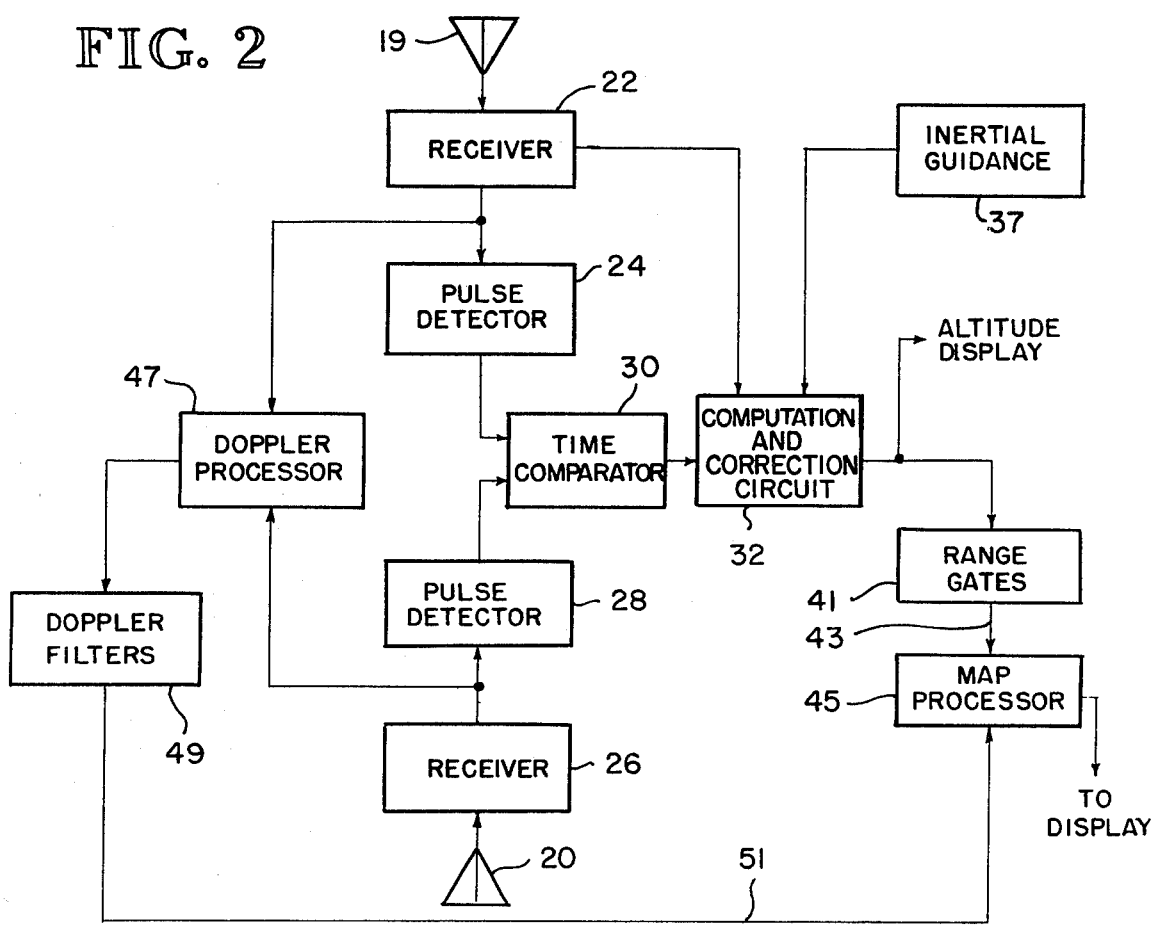
FIG. 2 is a block diagram of the on-board airborne vehicle portion of the system of FIG. 1.

The processing of the signals received over the respective signal paths 23 and 25 in FIG. 1, which results in both altitude and ground map information, is accomplished by the system of FIG. 2. In FIG. 2, the up-looking antenna 19 and the down-looking antenna 20 are shown as part of the onboard processing system. The signals from antenna 19 are applied to a series connected combination of a conventional receiver 22 and pulse detector 24, while a similar combination of a receiver 26 and pulse detector 28 receives signals from antenna 20. To determine altitude, the apparatus of FIG. 2 utilizes a time comparator 30. Time comparator 30 is a conventional device which includes a triggered clock in the embodiment shown. In operation, the clock is started upon receipt of pulses transmitted at a given time from signal source 13 by the up-looking antenna and stopped when pulses transmitted at the given time are received by the down-looking antenna 20. The time between the receipt of pulses by antenna 19 and the receipt of pulses by antenna 20 is thus determined by the clock.

The output of time comparator 30 will hence be the time difference between receipt of the signals generated by source 13 which travel, respectively, signal path 23 and signal path 25. This time difference output is then applied to a computation and correction circuit 32 which computes the altitude of the aircraft above the earth using the known geometry of the signal path, i.e. the geometry of signal paths 23 and 25 and the time difference data obtained from comparator 30. The output of circuit 32, which is the altitude of the airborne vehicle, can then be applied directly to a conventional altitude display apparatus.

The determination of altitude is simplest when the signal source 13 is directly overhead of the aircraft, in a non-inclined geosynchronous orbit. In such a case, the difference in time between the signals received by the antennas on the aircraft over the two signal paths can be easily calculated, without correction, to determine the altitude of the aircraft. This example is shown in FIG. 3a, where the aircraft 17 is directly between the signal source 13 and the earth. The distance 34 is the altitude of the aircraft, which is to be determined. The dotted line 36 represents the signal path between the satellite and the aircraft, and the dashed line 38 represents the signal path 38 between the satellite, the earth and the plane.

If, however, there is a graze angle between the signal source 13 on the satellite 11 and the aircraft 17, such as shown in FIG. 3b, where the signals over signal paths 40 and 42 come to the aircraft at an angle, then an adjustment must be made to the calculations to compensate for the spacial relationship between the satellite and the aircraft. This situation occurs when the satellite is not in orbit with the equator. Latitude information is supplied by the inertial guidance system 37, which enables the correction and calculation circuit 32 to calculate the altitude. This calculation, once the latitude is known, is relatively straightforward and conventional.

The above-described principles and the circuit of FIG. 2 are also useful with a satellite in a non-geosynchronous orbit, although the resulting geometric calculations become more complex. Typically, it can be accomplished if the actual orbit of the satellite is known and stored in memory, or with the aid of direction of arrival circuitry, which requires another up-looking antenna.

The apparatus of the present invention also has a ground mapping capability. In ground mapping, each individual quantity of information is referred to as a cell, and is provided by the signals reflected to the aircraft from the earth. A representation of the terrain is achieved by compiling a composite of a large number of cells. This is a well-known and widely used concept.

When the terrain composite picture is completed, its particulars are compared with actual terrain maps stored in memory, and through known correlation techniques, the exact location of the aircraft relative to the earth is determined. Referring to FIGS. 2 and 4 in more detail, a ground map is achieved by determining both range and azimuth information for the reflected signals. A composite picture of the terrain can be organized if the point of reflection on the ground of each signal cell can be identified. Thus, range and azimuth information of the reflected signals is necessary to correctly organize the composite picture. The information in the composite picture, however, depends on the magnitude of each cell, as different objects on the ground will reflect the signals to different extents.

Referring to FIG. 4, the possible range values of a cell are a locus of points in the shape of a circle, centered on the aircraft, such as circle 31 in FIG. 4. The possible azimuth values are a locus of points in the form of a straight line beginning at the aircraft, such as line 33a in FIG. 4. The precise point of reflection for a particular signal is thus described by both a range and an azimuth value, such as point 35 in FIG. 4. When this range and azimuth information is obtained for a plurality of reflected signal cells, an accurate picture of the entire terrain may be produced. The result is a map of the terrain relative to the aircraft which may then be compared with an actual terrain map, stored in memory, to determine the precise location of the aircraft.

Referring to FIG. 2 again, the range information for each signal cell is determined by a comparison of the relative times of receipt of the signals over the signal paths 23 and 25, respectively (FIG. 1), while the azimuth information for each signal cell is determined by a resolution of the Doppler frequency difference between the signals received over signal paths 23 and 25.

In range determination, the same output from time comparator circuit 30 which is used to determine aircraft altitude is also used to determine range information for the signal cells comprising the ground map. The computation and correction circuit makes an adjustment of the output of time comparator 30 to account for the geometry of the system, and the resulting output is applied to a plurality of range gates 41, which in the embodiment shown are a series of adders with time delays, and which perform a conventional time gating function. Each gate is set for successive established time intervals. The output of the range gate circuitry on outline 43 is the range value for a particular signal cell corresponding to the time difference provided by time comparator 30. The range value establishes that the signal cell is located along a locus of points which defines a circle, such as circle 31 in FIG. 4.

The azimuth information is obtained by conventional Doppler processing techniques. The azimuth information is obtained by a frequency comparison, rather than a time comparison, as is used to obtain the range information. As the aircraft moves relative to the earth, the frequency of the received reflected signal cells will be higher forward of the aircraft and lower to the rear of the aircraft. The maximum Doppler occurs along a line directly in front of the aircraft; the minimum Doppler occurs along a line directly to the rear of the aircraft. Along a line extending directly out from the sides of the aircraft, the Doppler frequency remains the same, as if there were no movement of the aircraft relative to the earth. Thus, evaluation of the Doppler frequency of a given reflected signal cell will provide the azimuth or angle information for the signal cell, which, when combined with the range information for that signal cell, will precisely locate that cell on the ground.

Referring now to FIG. 2, to determine the azimuth angle, the signal from the receivers 22 and 26 are applied to two inputs of a Doppler processor 47, which is a frequency comparator, and thus in operation compares the frequency of the signal cell against a baseline frequency. The output of the processor 47 is then applied to a set of Doppler frequency filters 49, which matches the frequency information from processor 47 to a corresponding angle. This angle information, which is the azimuth angle of the signal cell, is then applied on line 51 to a map processor 45, a conventional, known device, which combines the azimuth angle information with the range information for a plurality of cells to produce the composite terrain picture. The actual azimuth angle information from the Doppler filters 49 refers either to the locus of points 33a in FIG. 4, or its mirror image 33b. To differentiate between these two possibilities, the antenna is aimed so as to pick up only one. A scanning antenna may also be utilized, differentiating between the two sides.

The portion of FIG. 2 which is directed toward Doppler processing and filtering, i.e., elements 47, 49, in combination with map processor 45 is known and in use in a configuration known as a beam sharpening radar. The principals of a beam sharpening radar are explained in numerous printed publications, one of which is *Doppler Radar Clutter* by J. L. Farrell and R. L. Taylor, IEEE Transactions in Aerospace and Navigational Electronics, ANE-11 #5, September 1964, pp. 162-172.

The only difference between a beam sharpening radar circuit and the structure shown in FIG. 2 is that with a satellite signal source in a noninclined, geosynchronous orbit, only half of the Doppler effect of a beam sharpening radar is observed, because the signal source is motionless relative to the ground. However, this difference is easily accommodated in the Doppler filtering circuitry. If, however, the satellite is in fact moving relative to the terrain as well, then more complex Doppler processing will be required.

The result of the processing of the range and angle information is a terrain map, as seen from the aircraft. This terrain map, which in appearance is like any other map produced by a radar, may then be compared with map information stored in the memory of the guidance system. Through conventional terrain correlation techniques, the actual position of the missile may then be located and necessary adjustments made to the flight of the missile.

The apparatus of the present invention may also be utilized to operate as a synthetic aperture radar (SAR). In such an embodiment, the same signal processing techniques described above are used, except that the resolution of the resulting map is increased significantly. The term synthetic aperture radar refers to a system in which a large receiving antenna is stimulated by a small antenna, which is moved, such as by an aircraft, in a manner which simulates the configuration of a large aperture antenna. The aircraft having the small antenna flies along a line several miles long, and circuit corrections are made to simulate the curve of a large antenna. Since the resolution of any radar system increases with the size of the antenna, the resolution of the system of the present invention can be increased with SAR techniques.

The operational range of the system over the ground may be ascertained by the following calculation:

$$R_{T-R}^2 = \frac{P_I G_I G_R \lambda^2 \sigma G_p}{4\pi^3 (R_{I-T})^2 KTB\, NF\, S/N\, L}$$

where $R_{T-R}$ is the range from the ground to the down-looking antenna, $P_I$ is the power of the signal source, $G_I$ is the gain of the transmitting antenna associated with the signal source; $G_R$ is the gain of the aircraft; $\lambda$ equals the wavelength of the transmitted signal from the satellite; $\sigma$ is the cross-sectional area of the target area on the ground, corrected by the reflectivity value of the ground; $G_p$ is the process gain which is a signal-related factor; $R_{I-T}$ is the range from the signal source on the satellite to the ground; K is Boltzman's constant; T is the absolute temperature; B is the bandwidth of the receiving system on board the aircraft; NF is the receiving system noise figure; S/N is the signal-to-noise ratio for the system under operating conditions; and L is system losses, including atmospheric.

The equation can be manipulated much easier if the values are reduced to logarithmic values, due to the large numbers involved. Thus, in the following example, all the values are reduced to log equivalents, in db. As an example, the typical target area size on the earth is 100 feet square (approximately 30 db meters$^2$). The median reflectivity factor for terrain which includes inhabited areas such as cities as well as forests, cultivated land and deserts is 17 db below $1M^2/M^2$ for high graze angles and frequencies between L band and KU band. The value of $\sigma$ is thus 30 db $M^2 - 17$ db $M^2 = 13$ db meters. When the signal source is in a non-inclined geosynchronous orbit of approximately 20,000 nautical miles, the peak power transmitted, as an example, could be 1 megawatt; from which $P_I$ may be determined (60 dbw peak). The illuminator aperture is 100 meters in diameter, from which $G_I$ may be determined (70 db). The down-looking antenna on the aircraft has a 0.3 M² aperture, from which $G_R$ may be determined (25 db). The frequency of the signal source is 3 GHz, from which $\lambda$ may be determined (−20 db meters). The system uses a pulse compression technique with a gain of 40 db, which is the value of $G_p$. The bandwidth needed for 40 db pulse compression is 100 MHz, from which B is determined (80 db). The receiving system has a 3 db noise figure at its input, and the signal to noise ratio is 2 db. The losses L, both system and atmospheric, are 7 db. The value of $(R_{I-T})^2$ is 151 db meters, KT is −204 dbw and $(4\pi)^3$ is 33 db.

The equation may be solved by adding the values in the numerator and subtracting the values in the denominator. For the above example, $(R_{T-R})^2$ is 116 db meters, and $R_{T-R}$ is 58 db meters, which equals 631,000 meters, which in turn is equivalent to 340 nautical miles.

Particular types of signals may be utilized in the system of the present invention in order to further disguise the guidance system. For instance, a technique known as low probability of intercept radar (LPIR) can be used, in which emissions are generated over a wide frequency range, so that the transmitted signal has a spread appearance, making it look like noise rather than radar emissions.

In addition, another technique, known as Joint Tactical Information Distribution System (JTIDS) may be used. This is a coded waveform system which in practice has been found to be very difficult to detect and jam. With this technique, part of the signal structure on the satellite is used for synchronization of actual communications between the satellite and the ground, involving a pulse compression technique similar to standard communication devices, but a portion of the signals are used as radar emissions. Thus, the emissions as a whole appear to be for communication, and not for radar, which is advantageous, since satellite communication signals are not usually jammed. This technique is more fully explained in the article by James Fawcett titled *Mystic Link Revealed*, Microwave Systems News, September 1977, pp. 81-94.

Thus, a system has been described which includes a satellite-based signal source which is used as a portion of a passive guidance system for aircraft, including missiles. The advantage to the system is that the aircraft does not have an active radar emission capability, and thus cannot be located through emission tracing techniques. Substantially conventional processing techniques are used on board the aircraft to analyze signals received over both a direct signal path from the signal source to the aircraft and a reflected signal path from the signal source to the earth and then to the aircraft. Altitude and ground map information are accurately and quickly determined by the processing system, and are used by on-board guidance mechanisms to correct the flight of the aircraft, if necessary.

Although a preferred embodiment of the invention has been disclosed herein for purposes of illustration, it will be understood that various changes, modifications and substitutions may be incorporated in such embodiment without departing from the spirit of the invention as defined by the claims which follow.

What is claimed is:

1. A passive system for ascertaining information concerning the position of an airborne vehicle relative to the earth comprising:
   a signal source located on a base remote from the airborne vehicle;
   antenna means located on the airborne vehicle for receiving (a) a set of incident signals, said incident signal set comprising signals generated by said signal source and transmitted directly to said antenna means from said signal source, and for receiving (b) a set of reflected signals, said reflected signal set comprising the same signals generated by said signal source but which have been reflected from the earth prior to reaching said antenna means; and
   means on the airborne vehicle for processing differences in selected characteristics of said incident and reflected sets of signals received by said antenna means, taking into account the angle, if any, between said signal source and the airborne vehicle, including means for comparing the times of receipt of said incident and reflected sets of signals and means for calculating the altitude of the airborne vehicle from the difference in the times of receipt of said incident and reflected sets of signals.

2. A passive system for ascertaining information concerning the position of an airborne vehicle relative to the earth, comprising:
   a signal source located on a base remote from the airborne vehicle;
   antenna means located on the airborne vehicle for receiving (a) a set of incident signals, said incident signal set comprising signals generated by said signal source and transmitted directly to said antenna means from said signal source, and for receiving (b) a set of reflected signals, said reflected signal set comprising the same signals generated by said signal source but which have been reflected from the earth prior to reaching said antenna means;
   means on the airborne vehicle for processing differences in selected characteristics of said incident and reflected sets of signals received by said antenna means, taking into account the angle, if any, between said signal source and the airborne vehicle, including means for comparing the times of receipt of said incident and reflected sets of signals and means for comparing the frequencies of said incident and reflected sets of signals;
   means using the output of said times of receipt comparing means and said frequency comparing means to develop range and azimuth information of the points of reflection on the earth of said reflected set of signals; and
   map processing means using the range and azimuth information to produce a map of the terrain over which the airborne vehicle is moving.

3. An apparatus of claim 1 or 2, wherein the base on which said signal source is located is a satellite.

4. An apparatus of claim 3, wherein said satellite is in a non-inclined, geosynchronous orbit.

5. An apparatus of claim 1 or 2, wherein said antenna means includes a first, up-looking antenna to receive said set of incident signals, and a second, down-looking antenna to receive said set of reflected signals.

6. An apparatus of claim 1 or 2, wherein said antenna means includes an omni-directional antenna capable of receiving both said incident and reflected sets of signals.

7. An apparatus of claim 1 or 2, wherein said processing means includes signal receiving means associated with said antenna means for said incident and reflected sets of signals, pulse detector means associated with each said signal receiver means, and means applying the outputs of the respective pulse detector means to said times of receipt comparing means.

* * * * *